United States Patent
Allison et al.

(10) Patent No.: US 11,905,882 B2
(45) Date of Patent: Feb. 20, 2024

(54) APPARATUS AND METHOD FOR LIQUID AIR ENERGY STORAGE WITH CARBON DIOXIDE CAPTURE

(71) Applicant: Southwest Research Institute, San Antonio, TX (US)

(72) Inventors: Timothy C. Allison, San Antonio, TX (US); Owen M. Pryor, San Antonio, TX (US); William M. Conlon, Palo Alto, CA (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/660,540

(22) Filed: Apr. 25, 2022

(65) Prior Publication Data

US 2023/0340909 A1    Oct. 26, 2023

(51) Int. Cl.
*F02C 6/00*  (2006.01)
*F23R 3/28*  (2006.01)
*F02C 7/08*  (2006.01)
*F01D 15/10* (2006.01)
*F02C 7/22*  (2006.01)
*F02C 6/18*  (2006.01)

(52) U.S. Cl.
CPC ............... *F02C 7/22* (2013.01); *F01D 15/10* (2013.01); *F02C 6/18* (2013.01); *F02C 7/08* (2013.01); *F23R 3/28* (2013.01)

(58) Field of Classification Search
CPC ...... F02C 6/00; F02C 7/08; F23R 3/28; F01D 15/10
See application file for complete search history.

(56) References Cited

U.S. PATENT DOCUMENTS 10,788,696 B2 * 9/2020 Kishimoto ........ G02F 1/133711
2018/0094550 A1 * 4/2018 Conlon .................. F01K 23/18

* cited by examiner

*Primary Examiner* — Deming Wan
(74) *Attorney, Agent, or Firm* — Grossman, Tucker, Perreault & Pfleger, PLLC

(57) ABSTRACT

Apparatus and methods for storing energy in liquid air and releasing the energy through a thermal power cycle, that incorporates liquid carbon dioxide capture and separation from the exhaust stream.

17 Claims, 4 Drawing Sheets

APPARATUS AND METHOD FOR LIQUID AIR ENERGY STORAGE WITH CARBON DIOXIDE CAPTURE

FIELD

Figure 1:
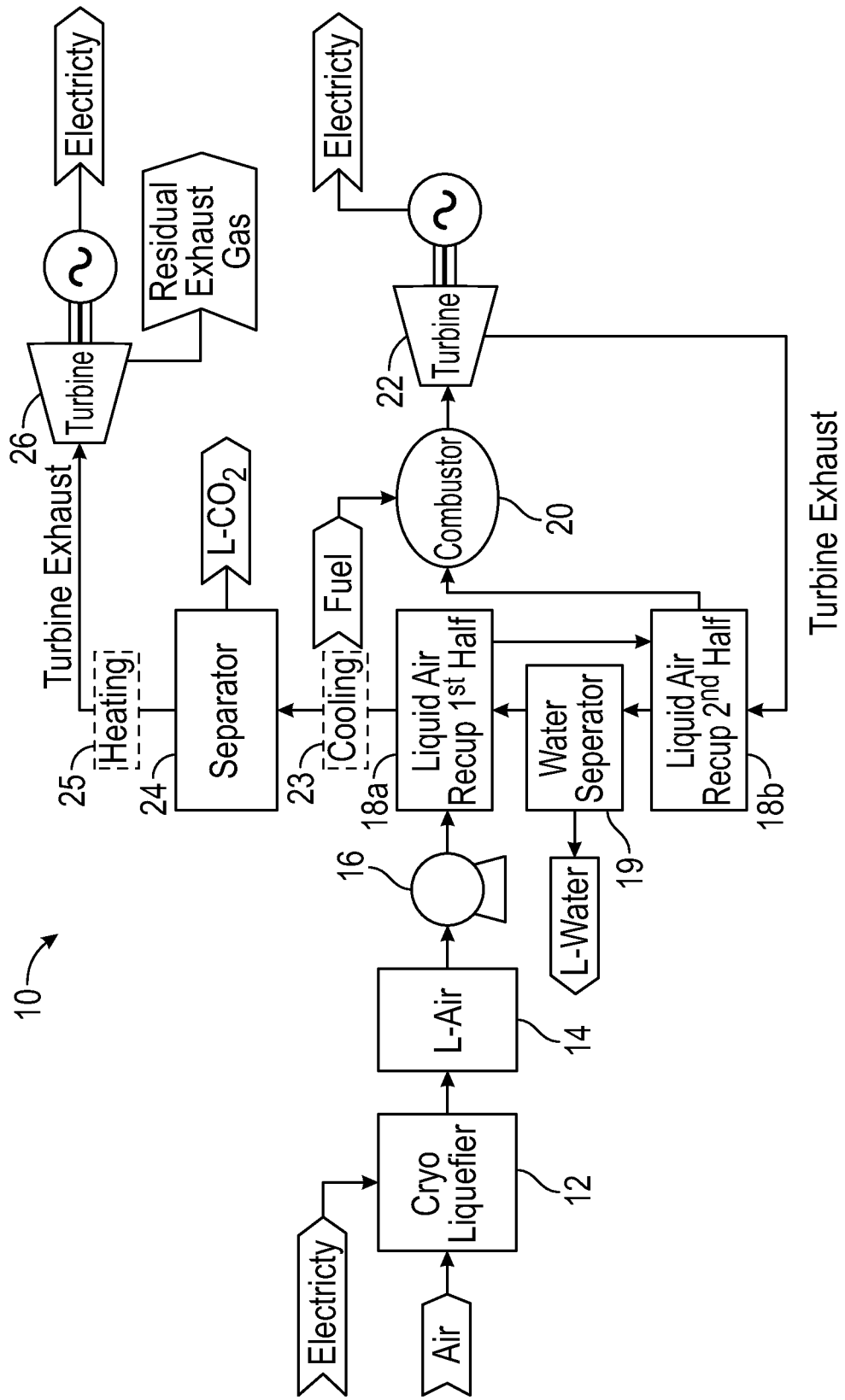

The present invention relates to the field of storing energy in liquid air and releasing the energy through a thermal power cycle, that incorporates liquid carbon dioxide capture and separation from the exhaust stream.

BACKGROUND

Energy production will increasingly rely on clean renewable sources in the future. As these technologies are implemented, problems with variability from time of day, season and unpredictable environmental factors (i.e. cloud cover) need to be mitigated. When the cost of electricity is low during times of high renewable energy output, energy can be stored to be utilized at later times when renewable output is unavailable, or energy demand exceeds the current level of renewable energy production. Three elements are preferably required for an effective energy storage system: initial energy to charge the system, a system to efficiently store the energy, and a system to discharge the energy to provide power.

SUMMARY

A liquid air energy release apparatus comprising: (a) a liquid air storage apparatus containing liquid air and a cryogenic pump fluidly connected to the liquid air storage apparatus wherein the cryogenic pump is configured to provide pressurized liquid air at a pressure of greater than 0.52 MPa; (b) a liquid air recuperator fluidly connected to the cryogenic pump configured to heat the pressurized liquid air and produce vaporized air; (c) a combustor fluidly connected to the liquid air recuperator configured to burn a fuel in the presence of the vaporized air and produce combustor exhaust; (d) a first turbine fluidly connected to the combustor configured to extract power from the combustor exhaust wherein the turbine exhaust is fluidly connected to the liquid air recuperator; and (e) a separator fluidly connected to the liquid air recuperator wherein the separator is configured to separate liquid carbon dioxide from the first turbine exhaust A method for releasing the energy of liquid air comprising providing liquid air at a pressure of greater than 0.52 MPa, directing the pressurized liquid air to a liquid air recuperator to heat and vaporize the pressurized liquid air and producing vaporized air. The vaporized air is directed to a combustor with burning of a fuel in the presence of the vaporized air and producing combustor exhaust. The combustor exhaust is directed to a first turbine and extracting power from the combustor exhaust and producing a first turbine exhaust. The first turbine exhaust is then directed to the liquid air recuperator to assist in the heating and vaporizing of the pressurized liquid air and then into a separator and separating liquid carbon dioxide from the first turbine exhaust.

An apparatus for liquid air energy release comprising a liquid air storage apparatus containing liquid air and a cryogenic pump fluidly connected to the liquid air storage apparatus wherein the cryogenic pump is configured to provide pressurized liquid air at a pressure of greater than 0.52 MPa. A liquid air recuperator is fluidly connected to the cryogenic pump wherein the liquid air recuperator is also connected to a separator for removal of liquid carbon dioxide and to a separator for removal of water from a first turbine exhaust, wherein the liquid air recuperator is configured to heat the pressurized liquid air and produce vaporized air. A combustor is fluidly connected to the liquid air recuperator configured to burn a fuel in the presence of the vaporized air and produce combustor exhaust. A first turbine is fluidly connected to the combustor and is configured to extract power from the combustor exhaust and produce the first turbine exhaust wherein the first turbine exhaust is fluidly connected to an exhaust air recuperator which exhaust air recuperator is fluidly connected to the water separator and the water separator is fluidly connected to the liquid air recuperator and the liquid air recuperator is fluidly connected to the carbon dioxide separator and the carbon dioxide separator is fluidly connected to the exhaust air recuperator. A second turbine is fluidly connected to the exhaust air recuperator to extract power from the first turbine residual exhaust gas.

A method for liquid air energy release comprising providing liquid air at a pressure of greater than 0.52 MPa and directing the pressurized liquid air to a liquid air recuperator to heat and vaporize the pressurized liquid air and producing vaporized air. The vaporized air is then directed to a combustor followed by burning of a fuel in the presence of the vaporized air and producing combustor exhaust and directing the combustor exhaust to a first turbine and extracting power from the combustor exhaust and producing a first turbine exhaust. The first turbine exhaust is directed to an exhaust air recuperator to assist in heating of the exhaust air followed by a water separator-and separating liquid water from the first turbine exhaust. The first turbine gas emerging from the water separator is directed through the liquid air recuperator followed by a carbon dioxide separator and separating liquid carbon dioxide from the first turbine exhaust and providing a first turbine exhaust gas that is substantially devoid of carbon dioxide and water. The first turbine exhaust that is substantially devoid of carbon dioxide and water is then directed through the exhaust gas recuperator along with heating of the first turbine exhaust gas and directing the heated first turbine exhaust gas through a second turbine and extracting power.

A liquid air energy release apparatus comprising a liquid air storage apparatus containing liquid air and a cryogenic pump fluidly connected to the liquid air storage apparatus wherein the cryogenic pump is configured to provide pressurized liquid air at a pressure of greater than 0.52 MPa. An organic Rankine cooler is then connected to the cyrogenic pump wherein the organic Rankine cooler contains a working fluid wherein the organic Rankine cooler is fluidly connected to a pump to increase the working fluid pressure, which organic Rankine cooler is fluidly connected to an organic Rankine recuperator and organic Rankine heater, wherein the working fluid is expanded and is fluidly connected to a turbine to extract power from the expanded working fluid, and wherein the expanded working fluid is then passed through the organic Rankine recuperator and then back into the organic Rankine cooler and then into the pump. A second liquid air recuperator is fluidly connected to the organic Rankine cooler and a first liquid air recuperator is connected to the second liquid air recuperator which second and first liquid air recuperators transfer heat to vaporize air. A combustor is fluidly connected to the second liquid air recuperator wherein the combustor burns a fuel in the presence of the vaporized air and produces combustor exhaust. A first turbine is fluidly connected to the combustor to extract power from the combustor exhaust and produces a first turbine exhaust. A separator to remove liquid water from the first turbine exhaust is provided along with a separator to remove liquid carbon dioxide from the first turbine exhaust.

DRAWINGS

FIG. 1 illustrates a first preferred embodiment of a liquid air energy storage system with liquid carbon dioxide capture.

Figure 2:
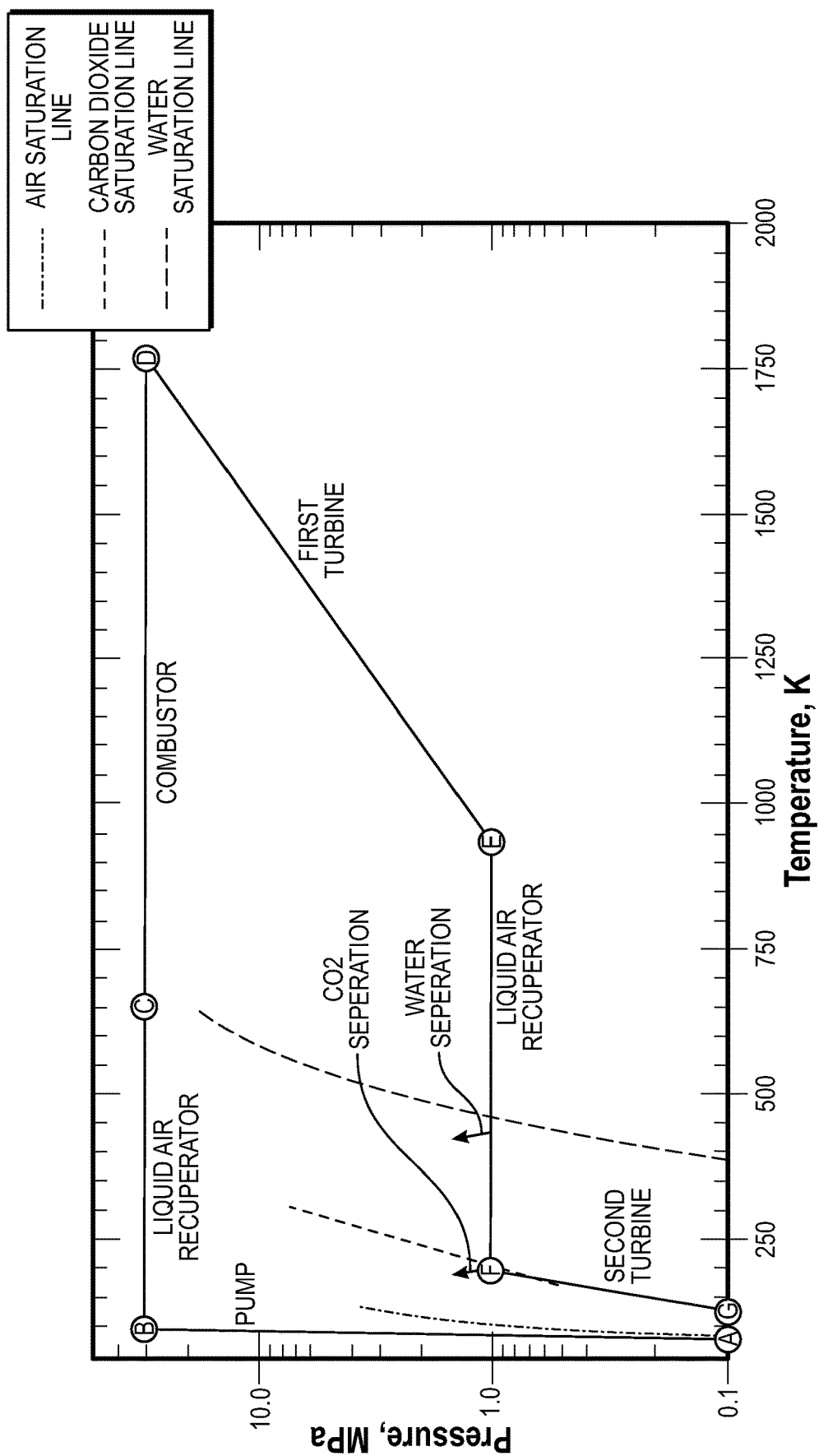

FIG. 2 provides a pressure-temperature phase diagram for the liquid air energy storage system herein with liquid carbon dioxide capture.

Figure 3:
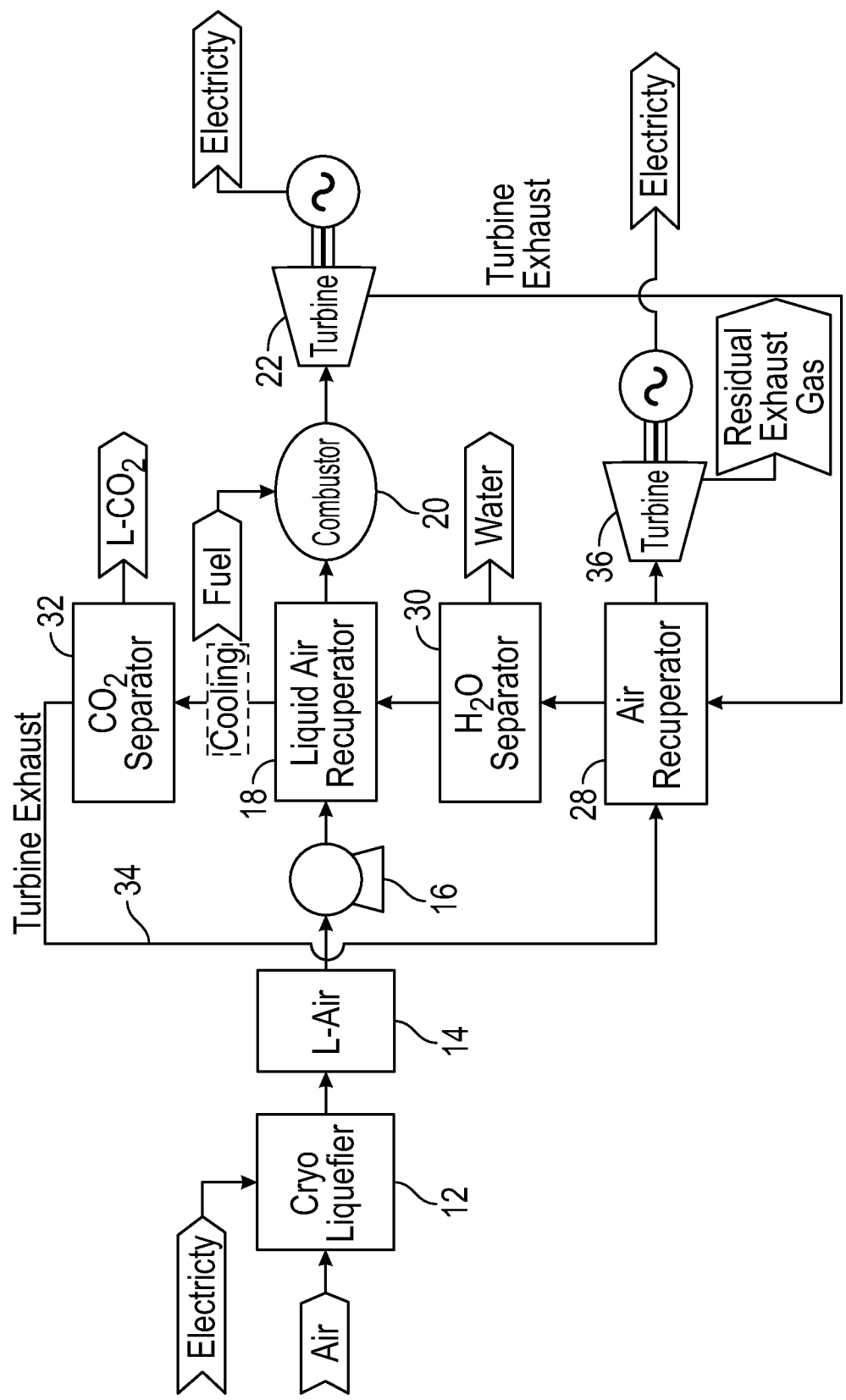

FIG. 3 illustrated another preferred embodiment of a liquid air energy storage system with liquid carbon dioxide capture.

Figure 4:
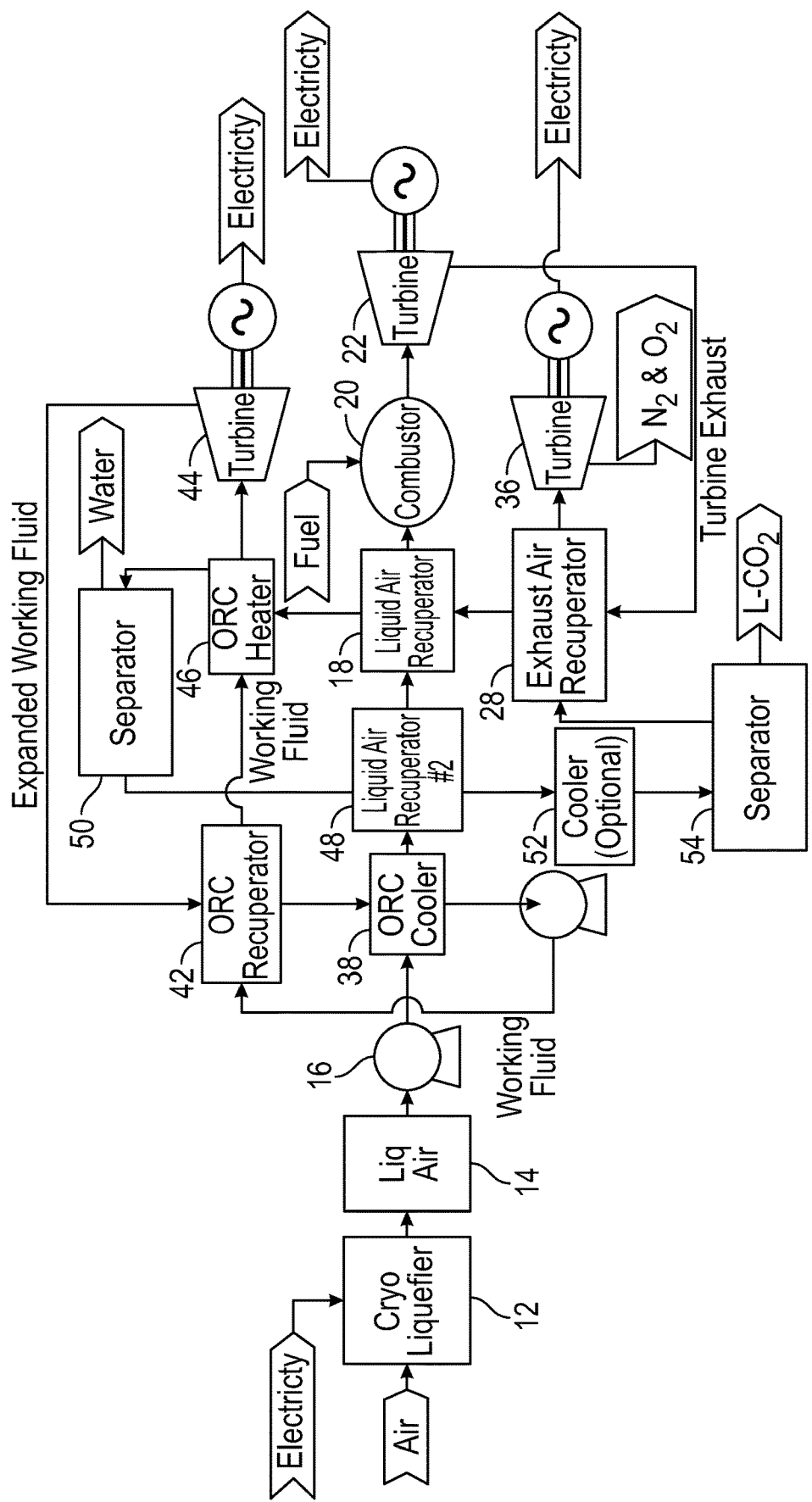

FIG. 4 illustrates another preferred embodiment of a liquid air energy storage system with liquid carbon dioxide capture.

DETAILED DESCRIPTION OF THE PREFERRED EMBODIMENTS

Attention is directed to FIG. 1 which illustrates a first preferred embodiment of a liquid air energy storage system 10 with liquid carbon dioxide capture. Air is initially introduced into an electrically driven cryo liquefier 12 which cools air and provides air in a liquid form. The supplied electricity may preferably be generated from excess renewable energy sources or any relatively low demand/low-cost electrical source. The liquefied air may then be stored in cryogenic storage vessel 14. Such liquefied air is contemplated to be stored for periods of one hour to several weeks (e.g., 3-4 weeks). The liquefied air may preferably be stored at a temperature of −196° C. and at about atmospheric pressure.

The stored liquid air is then sent and is fluidly coupled to a cryogenic pump 16 to increase the pressure to greater than 0.52 MPa. For example, the cryogenic pump can increase the pressure to a level greater than 0.52 MPa and up to 50 MPa. The pressurized and liquefied air is then introduced into a liquid air recuperator. The liquid air recuperator may preferably be present as a first liquid air recuperator 18a which is connected in series to a second liquid air recuperator 18b. The liquid air recuperators 18a and 18b, either alone or in combination, can then heat the pressurized and liquefied air to produce vaporized air, preferably relying upon heated exhaust emerging from the downstream exhaust turbine 22. Between the liquid air recuperators 18a and 18b one may then optionally provide at 19 for water separation, wherein water of combustion may be removed in liquid form from the turbine exhaust exiting turbine 22.

The vaporized air is introduced into a combustor 20 to burn with a carbon-containing fuel, preferably a hydrocarbon fuel, more preferably methane, resulting in a relatively hot, high-pressure fluid that includes water vapor and carbon dioxide as products of combustion. The combustor exhaust is then sent to a first turbine 22 to extract power which may then provide, e.g., electricity production. After the turbine 22 the relatively hot exhaust of the first turbine may be circulated, as alluded to above, to a liquid air recuperator wherein, as noted above, the relatively hot first turbine exhaust can heat and vaporize the pressurized liquid air, thereby cooling the first turbine exhaust. The first turbine exhaust then can optionally undergo additional cooling at 23 in order to condense carbon dioxide and water from the cooled turbine exhaust. Such optional additional cooling may be from an ambient heat sink or some other cold process. The cooled exhaust then proceeds to separator 24 wherein liquid carbon dioxide and (optionally) water can be conveniently separated by inertial or gravitational means from said first turbine exhaust at the preferred pressure range of greater than 0.52 MPa. Accordingly, the cooling provided by the liquid air recuperators 18a and 18b, either alone or in combination with the optional cooling at 23, are contemplated to provide sufficient cooling to separate liquid $CO_2$ at separator 24.

As now may be appreciated, since the condensation temperatures of water and carbon dioxide will be different, the cooling and separation may be staged to remove water first at 19 followed by additional cooling and subsequent carbon dioxide removal at the separator 24. The first turbine exhaust exiting the separator 24 may therefore now be substantially devoid of $CO_2$ and (optionally) water, meaning that the combined level of $CO_2$ and water remaining in the first turbine exhaust is now preferably at or below 5.0% by volume, more preferably at or below 2.5% by volume, or at or below 1.0% by volume. In addition, the level of $CO_2$ on its own may preferably be at or below 5.0% by volume, more preferably at or below 2.5% by volume or at or below 1.0% by volume.

The first turbine exhaust gas prior to introduction to second turbine 26 may contain nitrogen, water, oxygen, NOx and other combustion by-products, at a combined level of greater than 95.0% by volume, and such first turbine exhaust gas can then can optionally undergo additional heating at 25 and then be expanded in a second turbine 26 to again extract power and provide, e.g., electricity production. The second turbine then can exhaust to the atmosphere.

Attention is directed to FIG. 2 which provides a pressure-temperature phase diagram for the liquid air energy storage system 10 with liquid carbon dioxide capture. As can be seen, pressure temperature lines are provided for states A-G wherein at A the liquid air is identified at state A in the liquid storage state that is routed through the cryogenic pump to state B and then through the liquid air recuperator along lines B→C where it is heated and then introduced into the combustor and exits the combustor at D and into the first turbine along lines D→E and then the turbine exhaust from the first turbine is cooled in the liquid air recuperator along lines E→F, crossing the water saturation line (where water separation may occur) and carbon dioxide liquid-vapor saturation line, and then into the separator at state F where liquid $CO_2$ separation can occur followed by introduction into the second turbine at G. Table 1 below provides exemplary values for the pressure-temperature states A-G illustrated in FIG. 2:

TABLE 1

Exemplary Values For States A-G In FIG. 2

| State | Description | Pressure (MPa) | Temperature (K) | Enthalpy (J/kg) | Entropy (J/kg-K) | Specific Volume (m³/kg) |
|---|---|---|---|---|---|---|
| A | L-Air Storage | 0.10 | 78.9 | 0 | 0 | 1.14E−03 |
| B | L-Air Pump Exit | 30.40 | 93.7 | 48452 | 162 | 1.13E−03 |
| C | Combustor Inlet | 30.40 | 650.1 | 793030 | 3017 | 6.94E−03 |
| D | First Turbine Inlet | 30.40 | 1773.2 | 2124809 | 4197 | 1.78E−02 |
| E | First | 1.0 | 931.2 | 1094951 | 4411 | 2.65E−01 |

TABLE 1-continued

Exemplary Values For States A-G In FIG. 2

| State | Description | Pressure (MPa) | Temperature (K) | Enthalpy (J/kg) | Entropy (J/kg-K) | Specific Volume (m³/kg) |
|---|---|---|---|---|---|---|
| F | Turbine Exit CO2 Separator Exit | 1.0 | 228.0 | 350378 | 2938 | 6.37E−02 |
| G | Second Turbine Exit | 0.10 | 133.2 | 258226 | 3068 | 3.73E−01 |

As may therefore be appreciated from the above preferred embodiments, a process for storing liquid energy is contemplated, that provides liquid air in a storage medium and dispatching energy through a thermal power cycle. The power cycle provides liquid carbon dioxide capture and separation from an exhaust stream. The process therefore preferably includes an air liquefaction system, liquid air compression, liquid air vaporization via heat addition, and a plurality of expansion stages with carbon dioxide extracted in the liquid phase at pressures above 0.52 MPa, preferably in the range of greater than 0.52 MPa to 50 MPa.

Attention is directed to FIG. 3 which identifies another preferred embodiment of the present invention. As in FIG. 1 this preferred configuration again includes the introduction of air into a cryo liquefier 12 to provide cooled liquid air 14 that is introduced into a cryogenic pump 16 to again increase pressure to greater than 0.52 MPa. The pressurized and liquefied air is then introduced into a liquid air recuperator 18 which then heats the pressurized and liquefied air to produce vaporized air, preferably relying upon heated exhaust emerging from the downstream exhaust turbine 22. The vaporized air is then again introduced into a combustor 20 to burn with a fuel, preferably a hydrocarbon fuel, more preferably methane. The combustor exhaust is then sent to a first turbine 22 to extract power which may then again provide, e.g., electricity production.

As then shown in FIG. 3, the exhaust from first turbine 22 is optionally routed to an exhaust air recuperator 28 followed by an optional water separator 30 and then through the liquid air recuperator 18 and then through a $CO_2$ separator 32 for removal of liquid $CO_2$. Accordingly, the exhaust from the first turbine 22 may be used in the exhaust air recuperator to heat the exhaust emerging from the carbon dioxide separator 32. Optionally, the first turbine exhaust gas may then again be cooled after leaving the liquid air recuperator 18 and before introduction of the first turbine exhaust gas into the $CO_2$ separator 32. It should also be noted that while water is preferably removed from the optional stand-alone water separator 30, it is also contemplated that liquid water may be removed by the $CO_2$ separator 32.

Similar to FIG. 1, the $CO_2$ separator 32 therefore provides for carbon dioxide extraction in the liquid phase at pressures greater than 0.52 MPa. The first turbine residual exhaust gas in the line now at location 34 is therefore substantially devoid of $CO_2$ and (optionally) water, meaning that the combined level of $CO_2$ and (optionally) water is at or below 5.0% by volume, more preferably at or below 2.5% by volume, or at or below 1.0% by volume. In addition, the level of $CO_2$ on its own may again preferably be at or below 5.0% by volume, more preferably at or below 2.5% by volume or at or below 1.0% by volume.

Accordingly, such first turbine exhaust gas illustrated in FIG. 3 existing turbine 22 may then contain residual nitrogen, water, oxygen, NOx (chemical compounds of nitrogen and oxygen such as NO and $NO_2$) and other combustion by-products, at a combined level of greater than 95.0% by volume, is then routed to pass through the exhaust air recuperator 28 and where it can be heated and then expanded into a second turbine 36 to extract power and provide again, e.g., for additional electricity production. The exhaust from the second turbine 36 in FIG. 3 can then vent to the atmosphere. As may therefore be appreciated, the system in FIG. 3 allows for relatively more energy to be added into combustor 20 and provides for relatively more overall power output, than what is illustrated in FIG. 1.

Another preferred embodiment for storing energy in liquid air is illustrated in FIG. 4, which again relies upon the common features described above in both FIGS. 1 and 2. Therefore, once again, the liquid air energy release apparatus introduces air into a cryo liquefier 12 which cools air and provides air in liquid form. The liquefied air may then be stored in cryogenic storage vessel 14, for periods of one hour to several weeks. The liquefied air may again be preferably stored at a temperature of −196° C. and at about atmospheric pressure. The embodiment in FIG. 4, however, now adds an organic Rankine cycle (ORC) with an ORC recuperator 40, to allow for further extraction of power, along with the ability described herein to again remove liquid water and liquid carbon dioxide from combustion of the liquefied air.

The stored liquid air is then again sent and fluidly coupled to cryogenic pump 16 to increase the pressure to 0.52 MPa or higher. The pressurized and liquefied air is then introduced into an organic Rankine cycle (ORC) cooler 38 that utilizes a refrigerant, an example of which is a carbon-based working fluid, to convert energy flowing from a higher temperature heat source to a lower temperature heat sink into useful power. Such working fluids may preferably include hydrocarbons, such as isobutane, pentane or propane. The now cooled working fluid may then be forwarded to a pump 39 to increase pressure and then routed to the organic Rankine cycle recuperator at 40 and then to an organic Rankine cycle heater 42 where it is expanded and then directed to a turbine 44 for power generation. The now expanded working fluid is then routed back through the organic Rankine cycle recuperator at 40 wherein it may be partially cooled and then through the organic Rankine cycle cooler 38 for further cooling and then back through pump 39 to repeat the cycle.

As also illustrated in FIG. 4, the liquid air passing through organic Rankine cooler 38 can then proceed to liquid air recuperator #2, then to liquid air recuperator 18 and into combustor 20 where fuel may again be introduced, and combustion takes place to produce exhaust gas that is fed to first turbine 22 for power generation. The turbine exhaust then proceeds through exhaust air recuperator 28 and then through liquid air recuperator 18 and then through organic Rankine cycle heater 42 and then into separator 50 where water can be removed as a liquid. The exhaust gas with such water removed is then routed through a liquid air recuperator where it may undergo initial cooling and then optionally through a cooler and then into separator 54 where liquid carbon dioxide may be removed, and then into an exhaust air recuperator wherein it may be heated and expanded and then through a second turbine 56 for power generation, where the turbine 56 releases the residual exhaust gas to the environment. Similar to the embodiments described and illustrated in FIGS. 1-3, the combined level of $CO_2$ and water remaining in the exhaust that proceeds into second turbine 56 and that is released to the environment is such that the level is preferably at or below 5.0% by volume, more preferably at or below 2.5% by volume, or at or below 1.0% by volume. In addition, the level of $CO_2$ on its own may preferably be at or below 5.0% by volume, more preferably at or below 2.5% by volume or at or below 1.0% by volume.

Other advantages of the liquid air energy storage apparatus and method herein is such that the turbines 22, 44 and/or 56 herein, while illustrated as providing for electrical power, may be used for any other power requirements, such as powering a mechanical drive.

In addition, it is further contemplated herein that prior to introduction of the air into the embodiments disclosed herein, one may filter and remove nitrogen. Accordingly, during combustion with fuel, the level of NOx emission that is otherwise produced may be significantly reduced. It is also contemplated that the cold energy that is present in the stored liquid air herein may be itself utilized to provide cooling to facilitate the liquefaction of carbon dioxide. Finally, it also contemplated that in the embodiments disclosed herein, one may utilize ambient air to heat or cool the air as it is processed in the subject liquid air energy release apparatus and method described herein.

Accordingly, it can be appreciated that apparatus and methods for storing energy in liquid air have been disclosed, that involve releasing the stored energy in the liquid air through a thermal power cycle, that incorporates liquid carbon dioxide capture and separation from the exhaust stream. Preferred embodiments have been disclosed and those skilled in the art will recognize that various changes and modifications may be made herein with departing from the invention.

The invention claimed is:

1. A liquid air energy release apparatus comprising:
   a. a liquid air storage apparatus containing liquid air and a cryogenic pump fluidly connected to said liquid air storage apparatus wherein said cryogenic pump is configured to provide pressurized liquid air at a pressure of greater than 0.52 MPa;
   b. a liquid air recuperator fluidly connected to said cryogenic pump configured to heat said pressurized liquid air and produce vaporized air;
   c. a combustor fluidly connected to said liquid air recuperator configured to burn a fuel in the presence of said vaporized air and produce combustor exhaust;
   d. a first turbine fluidly connected to said combustor configured to extract power from said combustor exhaust and produce a first turbine exhaust wherein said first turbine exhaust is fluidly connected to said liquid air recuperator;
   e. a separator fluidly connected to said liquid air recuperator wherein said separator is configured to separate liquid carbon dioxide from said first turbine exhaust; and
   f. a second turbine fluidly connected to said separator to extract power from said first turbine exhaust.

2. The liquid air energy release apparatus of claim 1 wherein said cryogenic pump is configured to provide pressurized liquid air at a pressure in the range of greater than 0.52 MPa to 50 MPa.

3. The liquid air energy release apparatus of claim 1 including a cooling apparatus fluidly connected between said liquid air recuperator and said separator.

4. A method for releasing the energy of liquid air comprising:
   a. providing liquid air at a pressure of greater than 0.52 MPa;
   b. directing said pressurized liquid air to a liquid air recuperator to heat and vaporize said pressurized liquid air and producing vaporized air;
   c. directing said vaporized air to a combustor and burning of a fuel in the presence of said vaporized air and producing combustor exhaust;
   d. directing said combustor exhaust to a first turbine and extracting power from said combustor exhaust and producing a first turbine exhaust; and
   e. directing said first turbine exhaust to said liquid air recuperator to assist in said heating and vaporizing of said pressurized liquid air and then into a separator and separating liquid carbon dioxide from said first turbine exhaust;
   f. directing said first turbine exhaust after separation of said liquid carbon dioxide to a second turbine and extracting power from said first turbine exhaust.

5. The method of claim 4 wherein said liquid air is at a pressure in the range of greater than 0.52 MPa to 50 MPa.

6. The method of claim 4, including the step of cooling said first turbine exhaust prior after passing through said liquid air separator and before separating said liquid carbon dioxide.

7. The method of claim 4 wherein said first turbine exhaust, after separation of liquid carbon dioxide, indicates a combined level of carbon dioxide and water that is at or below 5.0% by volume.

8. The method of claim 4 wherein said first turbine gas, prior to introduction into said separator for removal of liquid carbon dioxide, is introduced into a water separator and removing liquid water.

9. A apparatus for liquid air energy release comprising:
   a. a liquid air storage apparatus containing liquid air and a cryogenic pump fluidly connected to said liquid air storage apparatus wherein said cryogenic pump is configured to provide pressurized liquid air at a pressure of greater than 0.52 M Pa;
   b. a liquid air recuperator fluidly connected to said cryogenic pump wherein said liquid air recuperator is also connected to a carbon dioxide separator for removal of liquid carbon dioxide and to a water separator for removal of water from a first turbine exhaust, wherein said liquid air recuperator is configured to heat said pressurized liquid air and produce vaporized air;
   c. a combustor fluidly connected to said liquid air recuperator configured to burn a fuel in the presence of said vaporized air and produce combustor exhaust;
   d. a first turbine fluidly connected to said combustor configured to extract power from said combustor exhaust and produce said first turbine exhaust wherein said first turbine exhaust is fluidly connected to an exhaust air recuperator which exhaust air recuperator is fluidly connected to said water separator and said water separator is fluidly connected to said liquid air recuperator and said liquid air recuperator is fluidly connected to said carbon dioxide separator and said carbon dioxide separator is fluidly connected to said exhaust air recuperator; and
   e. a second turbine fluidly connected to said exhaust air recuperator to extract power from said first turbine exhaust.

10. The liquid air energy release apparatus of claim 9 wherein said cryogenic pump is configured to provide pressurized liquid air at a pressure of 0.52 MPa to 50 MPa.

11. The liquid air energy release apparatus of claim 9 wherein said cryogenic pump is configured to provide pressurized liquid air at a pressure of 0.52 MPa to 30 MPa.

12. The liquid air energy release apparatus of claim 9 includes a cooling apparatus fluidly connected between said liquid air recuperator and said carbon dioxide separator.

13. A method for liquid air energy release comprising:
a. providing liquid air at a pressure of greater than 0.52 MPa;
b. directing said pressurized liquid air to a liquid air recuperator to heat and vaporize said pressurized liquid air and producing vaporized air;
c. directing said vaporized air to a combustor and burning a fuel in the presence of said vaporized air and producing combustor exhaust;
d. directing said combustor exhaust to a first turbine and extracting power from said combustor exhaust and producing a first turbine exhaust;
e. directing said first turbine exhaust to an exhaust air recuperator to assist in heating of said exhaust air followed by a water separator and separating liquid water from said first turbine exhaust;
f. directing said first turbine exhaust emerging from said water separator through said liquid air recuperator followed by a carbon dioxide separator and separating liquid carbon dioxide from said first turbine exhaust and providing said first turbine exhaust gas that is substantially devoid of carbon dioxide and water;
g. directing said first turbine exhaust that is substantially devoid of carbon dioxide and water through said exhaust gas recuperator and heating said first turbine exhaust gas and directing said heated first turbine exhaust gas through a second turbine and extracting power.

14. The method of claim 13 wherein said first turbine exhaust that is substantially devoid of carbon dioxide and water, indicates a combined level of carbon dioxide and water that is at or below 5.0% by volume.

15. A liquid air energy release apparatus comprising:
a. a liquid air storage apparatus containing liquid air and a cryogenic pump fluidly connected to said liquid air storage apparatus wherein said cryogenic pump is configured to provide pressurized liquid air at a pressure of greater than 0.52 M Pa;
b. an organic Rankine cooler connected to said cryogenic pump wherein said organic Rankine cooler contains a working fluid wherein said organic Rankine cooler is fluidly connected to a pump to increase the working fluid pressure, which said organic Rankine cooler is fluidly connected to an organic Rankine recuperator and organic Rankine heater, wherein said working fluid is expanded and is fluidly connected to a turbine to extract power from said expanded working fluid, and wherein said expanded working fluid is then passed through said organic Rankine recuperator and then back into said organic Rankine cooler and then into said pump;
c. a second liquid air recuperator fluidly connected to said organic Rankine cooler and a first liquid air recuperator connected to said second liquid air recuperator which second and first liquid air recuperators transfer heat to vaporized air;
d. a combustor fluidly connected to said second liquid air recuperator wherein said combustor burns fuel in the presence of said vaporized air and produces combustor exhaust;
e. a first turbine fluidly connected to said combustor to extract power from said combustor exhaust and produce a first turbine exhaust;
f. a water separator to remove liquid water from said first turbine exhaust;
g. a carbon dioxide separator to remove liquid carbon dioxide from said first turbine exhaust.

16. A liquid air energy release apparatus comprising:
a. a liquid air storage apparatus containing liquid air and a cryogenic pump fluidly connected to said liquid air storage apparatus wherein said cryogenic pump is configured to provide pressurized liquid air at a pressure of greater than 0.52 MPa;
b. a liquid air recuperator fluidly connected to said cryogenic pump configured to heat said pressurized liquid air and produce vaporized air;
c. a combustor fluidly connected to said liquid air recuperator configured to burn a fuel in the presence of said vaporized air and produce combustor exhaust;
d. a first turbine fluidly connected to said combustor configured to extract power from said combustor exhaust and produce a first turbine exhaust wherein said first turbine exhaust is fluidly connected to said liquid air recuperator; and
e. a separator fluidly connected to said liquid air recuperator wherein said separator is configured to separate liquid carbon dioxide from said first turbine exhaust including a cooling apparatus fluidly connected between said liquid air recuperator and said separator.

17. A method for releasing the energy of liquid air comprising:
a. providing liquid air at a pressure of greater than 0.52 MPa;
b. directing said pressurized liquid air to a liquid air recuperator to heat and vaporize said pressurized liquid air and producing vaporized air;
c. directing said vaporized air to a combustor and burning of a fuel in the presence of said vaporized air and producing combustor exhaust;
d. directing said combustor exhaust to a first turbine and extracting power from said combustor exhaust and producing a first turbine exhaust; and
e. directing said first turbine exhaust to said liquid air recuperator to assist in said heating and vaporizing of said pressurized liquid air and then into a separator and separating liquid carbon dioxide from said first turbine exhaust, wherein said first turbine exhaust prior to introduction into said separator for removal of liquid carbon dioxide, is introduced into a water separator and removing liquid water.

\* \* \* \* \*